United States Patent
Manmohan et al.

(10) Patent No.: US 9,300,693 B1
(45) Date of Patent: Mar. 29, 2016

(54) SYSTEMS AND METHODS FOR PREVENTING DATA LOSS OVER VIRTUALIZED NETWORKS

(71) Applicant: Symantec Corporation, Mountain View, CA (US)

(72) Inventors: Sarin Sumit Manmohan, Pune (IN); Ravindra Daramwar, Nanded (IN); Jogesh Sharma, Jammu and Kashmir (IN)

(73) Assignee: Symantec Corporation, Mountain View, CA (US)

( * ) Notice: Subject to any disclaimer, the term of this patent is extended or adjusted under 35 U.S.C. 154(b) by 10 days.

(21) Appl. No.: 14/495,637

(22) Filed: Sep. 24, 2014

(51) Int. Cl.
*H04L 29/02* (2006.01)
*H04L 29/06* (2006.01)
*G06F 9/455* (2006.01)

(52) U.S. Cl.
CPC .......... *H04L 63/20* (2013.01); *G06F 9/45558* (2013.01); *G06F 2009/45587* (2013.01); *G06F 2009/45595* (2013.01); *H04L 63/0227* (2013.01)

(58) Field of Classification Search
None
See application file for complete search history.

(56) References Cited

U.S. PATENT DOCUMENTS

| | | | |
|---|---|---|---|
| 8,166,474 B1 * | 4/2012 | Delco | G06F 9/45558 709/226 |
| 8,565,108 B1 * | 10/2013 | Marshall | G06F 21/60 370/252 |
| 2011/0113467 A1 * | 5/2011 | Agarwal | G06F 21/6281 726/1 |
| 2013/0276092 A1 * | 10/2013 | Sun | H04L 63/0227 726/13 |
| 2014/0115578 A1 * | 4/2014 | Cooper | G06F 21/606 718/1 |

OTHER PUBLICATIONS

Foley, Security of the VMware vSphere Hypervisor, VMware, Jan. 2014.*
Spasov et al., Windows Filtering Platform, engine for local security, ICT ACT, 2010.*
"Websense", http://www.websense.com/content/websense-data-security-products.aspx, as accessed on Jul. 28, 2014, (Dec. 17, 2012).
"McAfee", http://www.mcafee.com/us/business-home.aspx?CID=MFEen-usMHP002, as accessed on Jul. 28, 2014, (Mar. 8, 2013).
"EMC", http://www.emc.com/services/rsa-services/index.htm, as accessed on Jul. 28, 2014, (Feb. 28, 2012).

* cited by examiner

*Primary Examiner* — Minh Dinh
(74) *Attorney, Agent, or Firm* — ALG Intellectual Property, LLC

(57) ABSTRACT

The disclosed computer-implemented method for preventing data loss over virtualized networks may include (1) receiving, by a data loss prevention callout driver registered to a switch, a network packet from a virtual machine, (2) identifying, by the data loss prevention callout driver registered to the switch, flow context information that specifies a context associated with transmitting the network packet, (3) providing the flow context information and the network packet to a data loss prevention service, and (4) applying, by the data loss prevention service, a data loss prevention policy to the network packet based on the flow context information. Various other methods, systems, and computer-readable media are also disclosed.

20 Claims, 7 Drawing Sheets

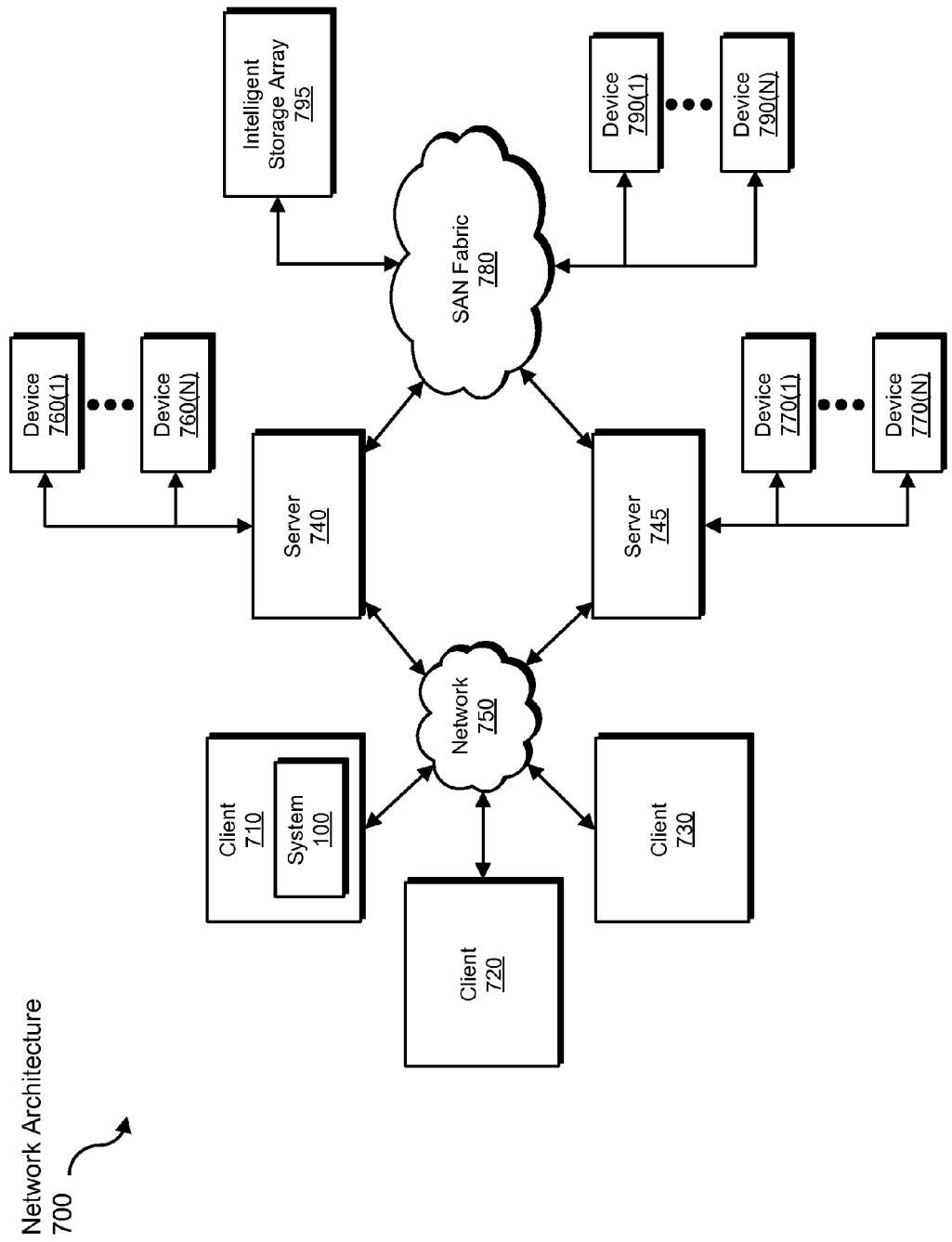

SYSTEMS AND METHODS FOR PREVENTING DATA LOSS OVER VIRTUALIZED NETWORKS

BACKGROUND

Organizations and individuals frequently seek to prevent computing systems from transmitting sensitive data outside or within a network. The network may include a virtual network that hosts virtual machines, which may connect to each other and/or to an external network through a virtual switch. To protect such a network, an organization may install data loss prevention software or products on the server that hosts the virtual machines. For example, a corporation may expect each virtual machine to maintain an endpoint protection agent to monitor network communications for data loss prevention policy violations.

Unfortunately, maintaining individual endpoint protection agents for each virtual machine may expose the agent to the end user. Such exposure may reveal information to the user that may allow them to circumvent the data loss prevention system. Maintaining multiple endpoint protection agents may additionally consume more system resources than may be desirable. Alternatives to endpoint agents, such as providing data loss prevention functionality at a gateway proxy, may involve the use of specific protocols. These protocols may fail to provide metadata that would otherwise permit execution of data loss prevention policies tailored to individual users. Additionally or alternatively, systems such as gateway proxies may fail to protect against forms of data loss that do not involve information leaving the network, such as data transfers between virtual machines. Accordingly, the instant disclosure identifies and addresses a need for additional and improved systems and methods for preventing data loss over virtualized networks.

SUMMARY

As will be described in greater detail below, the instant disclosure describes various systems and methods for preventing data loss over virtualized networks by, for example, monitoring and analyzing network traffic passing through a virtual switch while accounting for the origin of the network traffic. In one example, a computer-implemented method for preventing data loss over virtualized networks may include (1) receiving, by a data loss prevention callout driver registered to a switch, a network packet from a virtual machine, (2) identifying, by the data loss prevention callout driver registered to the switch, flow context information that specifies a context associated with transmitting the network packet, (3) providing the flow context information and the network packet to a data loss prevention service, and (4) applying, by the data loss prevention service, a data loss prevention policy to the network packet based on the flow context information.

The flow context information may contain a variety of features. In one embodiment, identifying, by the data loss prevention callout driver registered to the switch, the flow context information that specifies the context associated with transmitting the network packet may include identifying: (1) an executable path of an application that is attempting to transmit the network packet, (2) a user identification that identifies a user logged into the virtual machine that sent the network packet, and/or (3) a local internet protocol address, a local port number, a remote internet protocol address, and a remote port number that together describe a socket connection maintained by the switch.

The data loss prevention callout driver may manage a series of packets that are all associated with the same flow context information. In some examples, providing the flow context information and the network packet to the data loss prevention service may include receiving, by the data loss prevention callout driver, network packets transmitted to the switch and storing the network packets in a flow queue that is associated with the flow context information. Additionally or alternatively, providing the flow context information and the network packet to the data loss prevention service may include sending the network packets contained within the flow queue to the data loss prevention service and assembling them into a network stream.

In one embodiment, the data loss prevention service may reside within a parent partition associated with a hypervisor that manages the virtual machine. Additionally or alternatively, the data loss prevention service may prevent data loss across multiple virtual machines. Each virtual machine may be associated with a respective child partition, and the virtual machines may be managed by a hypervisor. In some embodiments, the switch may include a virtualized extensible switch within a virtual network. The virtualized extensible switch may execute within a kernel mode of a parent partition that may include a hypervisor that manages the virtual machine.

The network packet may be received in a variety of ways. In one embodiment, receiving, by the data loss prevention callout driver registered to the switch, the network packet from the virtual machine may include the switch receiving the network packet via a virtual bus. Additionally or alternatively, receiving the network packet from the virtual machine may include capturing the network packet from a network connection that transmitted the network packet from the virtual machine to the switch.

In some examples, applying the data loss prevention policy to the network packet may include determining that the network packet does not violate the data loss prevention policy and forwarding the network packet to an original destination via the switch. In other examples, applying the data loss prevention policy may include determining that the network packet violates the data loss prevention policy and blocking the network packet from being forwarded by the switch.

The data loss prevention service may inform users that they are in the process of committing a data loss prevention policy violation. In some examples, the computer-implemented method may further include delivering a user interface component to a child partition upon creation of the virtual machine at the child partition. Applying the data loss prevention policy may also include warning, by the user interface component, a user that the user may be taking actions that violate the data loss prevention policy. Applying the data loss prevention policy may further include requesting verification that the user would like to continue an action.

In some examples, identifying the flow context information that specifies the context associated with transmitting the network packet may include identifying the flow context information when the virtual machine successfully completes a socket connection. In one embodiment, the computer-implemented method may further include determining, by the data loss prevention callout driver based on the flow context information, that the socket connection is subject to the data loss prevention policy.

In one embodiment, a system for implementing the above-described method may include (1) a reception module, stored in memory, that receives, through a data loss prevention callout driver registered to a switch, a network packet from a virtual machine, (2) an identification module, stored in memory, that identifies, through the data loss prevention callout driver registered to the switch, flow context information that specifies a context associated with transmitting the network packet, (3) a provisioning module, stored in memory, that provides the flow context information and the network packet to a data loss prevention service, (4) an application module, stored in memory, that applies, through the data loss prevention service, a data loss prevention policy to the network packet based on the flow context information, and (5) at least one physical processor configured to execute the reception module, the identification module, the provisioning module, and the application module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, by a data loss prevention callout driver registered to a switch, a network packet from a virtual machine, (2) identify, by the data loss prevention callout driver registered to the switch, flow context information that specifies a context associated with transmitting the network packet, (3) provide the flow context information and the network packet to a data loss prevention service, and (4) apply, by the data loss prevention service, a data loss prevention policy to the network packet based on the flow context information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 is a block diagram of an exemplary computing network capable of implementing one or more of the embodiments described and/or illustrated herein.

Figure 1:
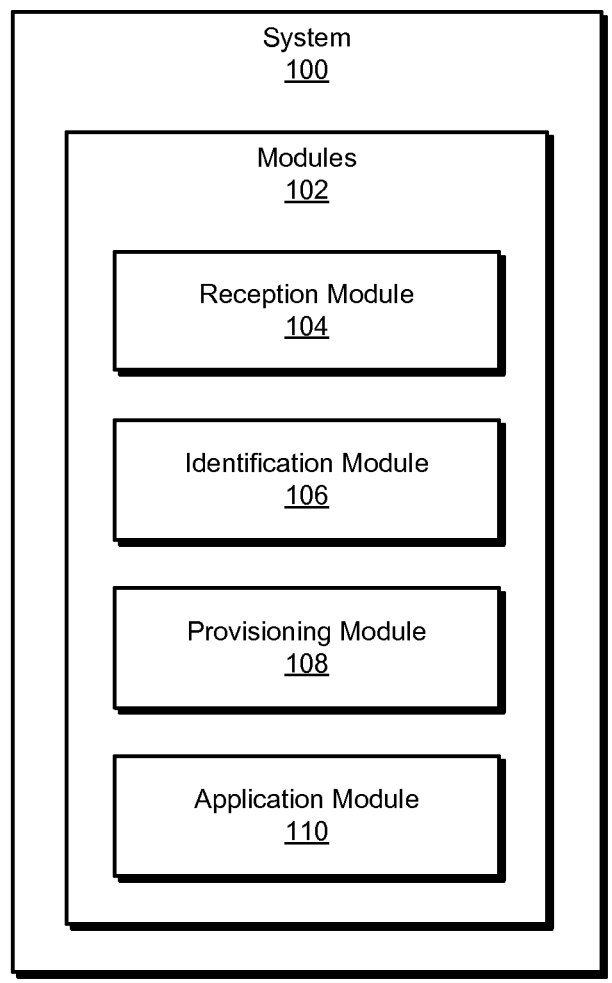
FIG. 1 is a block diagram of an exemplary system for preventing data loss over virtualized networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing data loss over virtualized networks. As will be explained in greater detail below, by monitoring network traffic through a virtual switch and obtaining context information pertaining to the traffic, the systems and methods described herein may efficiently protect virtual networks against data loss while maintaining granular control over selection of data loss prevention policies. Additionally or alternatively, the data loss prevention service may be screened from exposure to end users by virtue of being located in a parent partition of a virtual environment that is not accessible to end users. Moreover, providing a centralized data loss prevention callout driver at the virtual switch may eliminate the data loss prevention footprint in each virtual machine, thereby further eliminating management of separate data loss prevention agents at each virtual machine.

Figure 2:
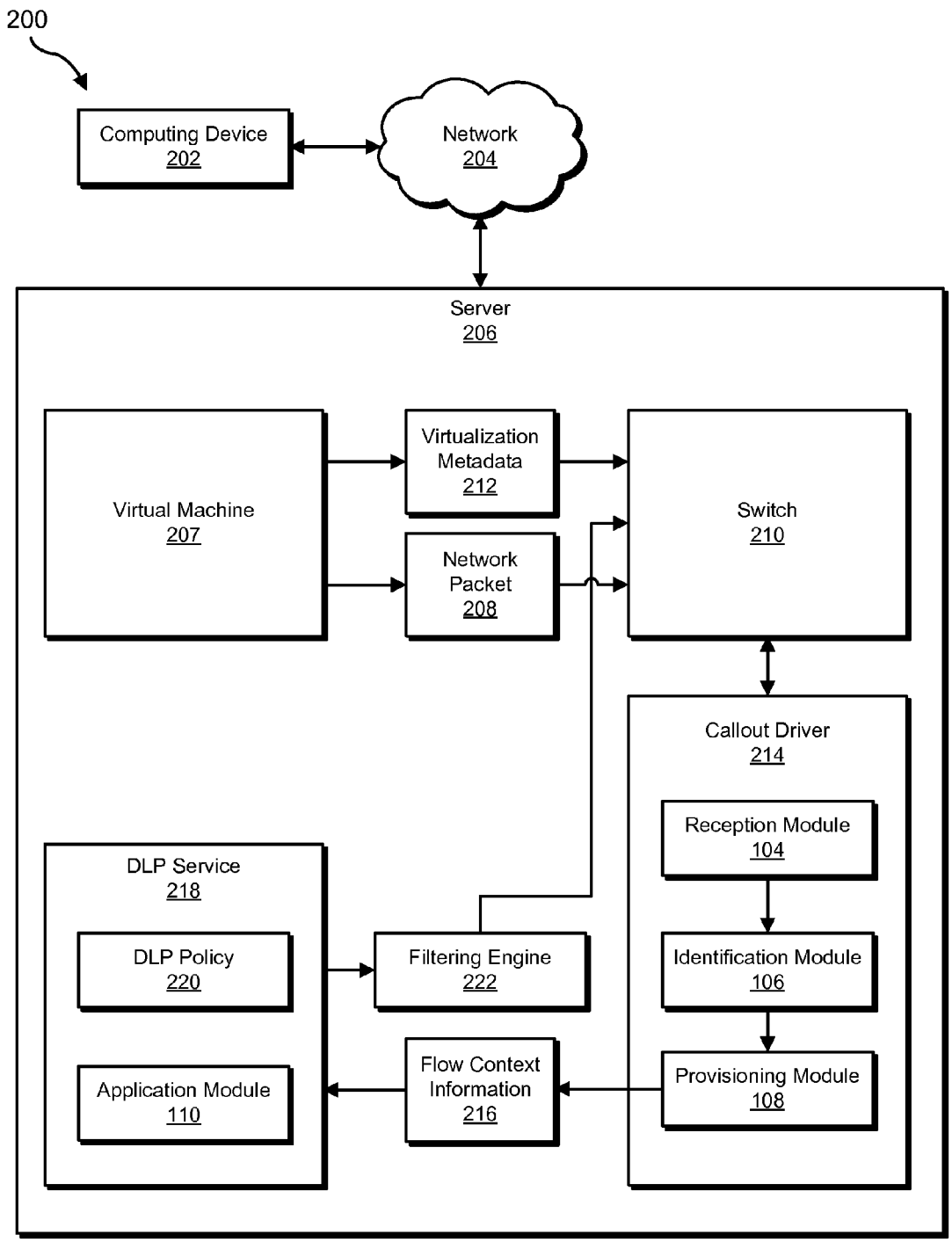
FIG. 2 is a block diagram of an additional exemplary system for preventing data loss over virtualized networks.

The following will provide, with reference to FIGS. 1-2, detailed descriptions of exemplary systems for preventing data loss over virtualized networks. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for preventing data loss over virtualized networks. As illustrated in this figure, exemplary system 100 may include one or more modules 102 for performing one or more tasks. For example, and as will be explained in greater detail below, exemplary system 100 may also include a reception module 104 that may receive, through a data loss prevention callout driver registered to a switch, a network packet from a virtual machine. Exemplary system 100 may additionally include an identification module 106 that may identify, through the data loss prevention callout driver registered to the switch, flow context information that specifies a context associated with transmitting the network packet. Exemplary system 100 may also include a provisioning module 108 that may provide the flow context information and the network packet to a data loss prevention service 218. Exemplary system 100 may additionally include an application module 110 that may apply a data loss prevention policy to the network packet based on the flow context information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to examine network traffic through a virtual network for data loss prevention policy violations. For example, and as will be described in greater detail below, one or more of modules 102 may cause computing device 202 and/or server 206 to prevent data loss over virtualized networks. As an example, and as will be described in greater detail below, reception module 104 may receive a network packet 208 from a virtual machine 207 by way of a data loss prevention callout driver 214 registered to a switch 210. Identification module 106 may identify, through data loss prevention callout driver 214, flow context information 216 that specifies a context associated with transmitting network packet 208. Identification module 106 may also use virtualization metadata 212 as part of identifying flow context information 216. Provisioning module 108 may provide flow context information 216 and network packet 208 to data loss prevention service 218. Application module 110 may apply a data loss prevention ("DLP") policy 220 to network packet 208 based on flow context information 216. Application module 110 may also use a filtering engine 222 as part of applying DLP policy 220.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is configured to communicate through a virtual network. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
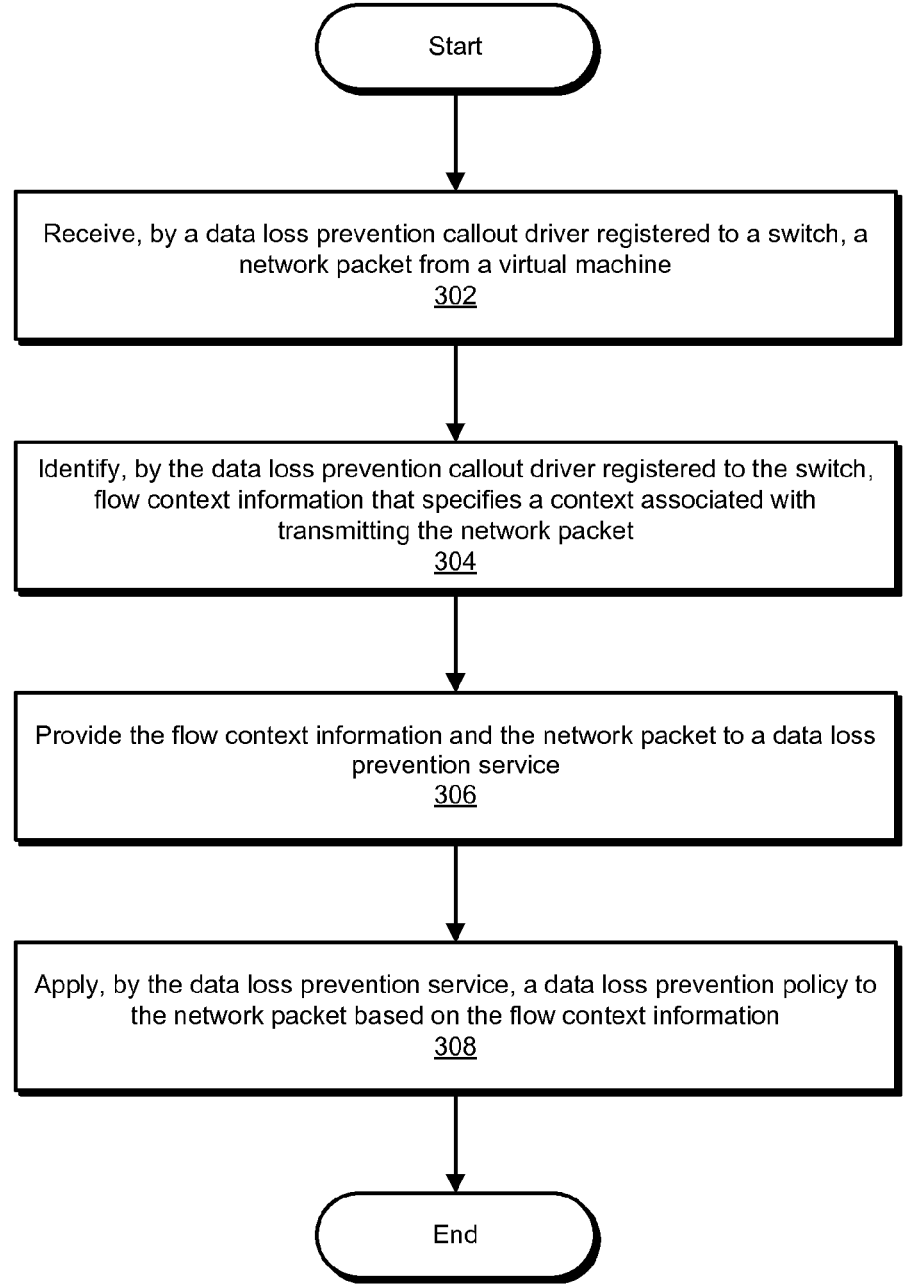
FIG. 3 is a flow diagram of an exemplary method for preventing data loss over virtualized networks.

FIG. 3 is a flow diagram of an exemplary computer-implemented method 300 for preventing data loss over virtualized networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may receive a network packet from a virtual machine. For example, reception module 104 may, as part of server 206 in FIG. 2, receive, through data loss prevention callout driver 214 registered to switch 210, network packet 208 from virtual machine 207.

The term "virtual network," as used herein, generally refers to any network that is composed of elements that are represented (e.g., simulated) either in whole or in part through software as opposed to hardware. Examples of network elements include, without limitation, computing devices, storage devices, switches, routers, firewalls, and/or the connections between such elements (e.g., Ethernet cables, telephone lines, wireless connections, or any other suitable network connection). Software may, for example, represent these elements by external virtualization (e.g., represent whole physical networks or parts of physical networks as a single virtual unit). In other examples, software may utilize internal virtualization (e.g., cause a single computing device to behave as though it were a different type of network element, or cause a single computing device to behave as though it were composed of a set of network elements).

The term "virtual machine," as used herein, generally refers to (1) any software-based imitation of a computing system that executes instructions as though it were a physical machine and/or (2) any operating system environment that is abstracted from computing hardware by a virtual machine manager (e.g., a hypervisor). Operation of a virtual machine may involve specialized hardware, software, or a combination of both. In one example, a virtual machine may support the execution of an operating system. In other examples, a virtual machine may execute a single program or set of instructions. A virtual machine may be a component of a virtual network.

The term "switch," as used herein, generally refers to any device and/or virtual device that may facilitate the routing of network packets between endpoint devices. A switch may also include a "virtual switch," i.e., software that may execute the functions of a switch as though it were a physical switch. For example, the switch may include a MICROSOFT WINDOWS HYPER-V virtual switch.

Moreover, the term "data loss prevention callout driver," as used herein, generally refers to a driver configured to perform one or more data loss prevention functions in cooperation with a data loss prevention service or application. In general, a data loss prevention callout driver may monitor and/or intercept network packets at a corresponding switch to perform data loss prevention functions that supplement the conventional switching functionality of the switch. The callout driver may include a kernel mode driver and may register its callouts with filtering engine 222. Similarly, the phrase "registered," as used herein, generally refers to the callout driver being configured or installed to the switch in a manner such that the callout driver performs the data loss prevention functions. In some examples, the callout driver may refer to a MICROSOFT WINDOWS specific callout driver that performs callouts to extend the WINDOWS FILTERING PLATFORM.

Reception module 104 may receive a network packet in a variety of ways and/or contexts. For example, reception module 104 may receive a network packet from a private virtual switch, i.e., a virtual switch that connects virtual machines operating on the same hardware as the virtual switch. In other examples, reception module 104 may receive a network packet from an external virtual switch, i.e., a virtual switch that connects one or more virtual machines to a hardware network adapter. In other examples, reception module 104 may receive a network packet from an internal virtual switch, i.e., a virtual switch that connects a parent partition and a child partition that are managed by the same hypervisor. As illustrated in FIG. 2, reception module 104 may, for example, receive network packet 208 at switch 210. In this example, switch 210 may represent a virtual switch residing on server 206 that may also host virtual machine 207. In one embodiment, the switch may include a virtualized extensible switch within a virtual network. In other embodiments, the virtualized extensible switch may execute within a kernel mode of a parent partition that may include a hypervisor that manages the virtual machine.

Reception module 104 may also receive a network packet in additional ways. In some examples, reception module 104 may receive the network packet via an internal connection such as a virtual bus. Additionally or alternatively, reception module 104 may capture the network packet from a network connection between a virtual machine (or an application at the virtual machine) and a switch. As illustrated in FIG. 2, reception module 104 may capture network packet 208 from virtual machine 207, preventing network packet 208 from being forwarded by switch 210.

The term "data loss prevention," sometimes referred to as "data leak/loss prevention" or "DLP," as used herein, generally refers to efforts by an individual and/or an organization (and corresponding software) to prevent the unauthorized transfer or removal of sensitive information, and may be communicated to individuals through data loss prevention policies. Two major forms of DLP include data loss prevention and data leak prevention. "Loss" may refer to information being removed or lost from a storage location such that the file no longer exists in the original storage location. "Leak" may refer to creating a copy of sensitive information and transmitting the copy in an unauthorized fashion. For ease of use, the term "data loss prevention" (and its derivatives) as used herein may refer to both forms of unauthorized data transfer and/or removal.

Examples of sensitive information include, without limitation, payroll documents, tax forms, employee medical records, software that is under development, photographs of prototype hardware, or any other information that the individual or organization deems sensitive. Examples of data loss prevention policies may include, for example, "do not e-mail employee medical records" or "payroll documents may only be transmitted in an encrypted form." Data loss prevention may be implemented in a variety of forms. DLP may be applied to digital communications, such as e-mail and/or Internet browsing. In these examples, a company may use monitoring software to determine if a communication violates a DLP policy.

Returning to FIG. 3 at step 304, one or more of the systems described herein may identify, through the data loss prevention callout driver registered to the switch, flow context information that specifies a context associated with transmitting the network packet. For example, identification module 106 may, as part of server 206 in FIG. 2, identify, through data loss prevention callout driver 214 registered to switch 210, flow context information 216 that specifies a context associated with transmitting network packet 208.

As used herein, the term "flow context information" generally refers to data and/or metadata external to the network packet that provides information (e.g., information missing from the network packet) about the transmission of the network packet. The failure or inability to analyze flow context information may have prevented conventional switches, drivers, and data loss prevention services or applications from performing the improved and more granular data loss prevention functions of the systems described herein. Exemplary items of flow context information include (1) an identifier of the application that completed the socket connection and/or transmitted the network packet, (2) an identifier of the user using the application and/or transmitting the network packet, and/or (3) a partial or complete executable path of the application. In exemplary embodiments, virtualization metadata in a virtualization system, such as WINDOWS HYPER-V, may provide or indicate the flow context information.

Identification module 106 may identify the flow context information in a variety of ways and/or contexts. For example, identification module 106 may identify information unique to the user and/or application that are attempting to transmit the network packet. Examples of applications that may attempt to transmit a network packet may include, without limitation, web browsers, automatic software update programs, remote desktop access applications, electronic mail applications, instant messaging programs, and/or any other application, program, or software that attempts to transmit a network packet. These applications may be identified in a variety of ways and/or contexts. For example, an application may be identified by a full executable file path. Additionally or alternatively, an application may be identified by the name of a software publisher (e.g., SYMANTEC) and/or a digitally signed certificate. For example, identification module 106 may identify flow context information 216 by using information that may be contained as part of virtualization metadata 212 or indicated by virtualization metadata 212.

As part of identifying the flow context information, identification module 106 may additionally or alternatively identify the protocol being used to transmit the network packet. In one example, the network packet may be transmitted under the secure HYPERTEXT TRANSFER PROTOCOL (HTTPS). Identification module 106 may decrypt a network packet transmitted under the HTTPS protocol in a fashion similar to a transparent SECURE SOCKET LAYER (SSL) proxy. If the protocol being used to transmit the network packet is not recognized by identification module 106, the network packet may be re-injected into the network packet's original connection to complete its transmission.

In one embodiment, identification module 106 may identify, through the data loss prevention callout driver registered to the switch, the flow context information that specifies the context associated with transmitting the network packet by identifying: (1) an executable path of an application that is attempting to transmit the network packet, (2) a user identification that identifies a user logged into the virtual machine that sent the network packet, and/or (3) a local internet protocol address, a local port number, a remote internet protocol address, and a remote port number that together describe a socket connection maintained by the switch. Identification module 106 may receive some or all of this information from or based on, virtualization metadata 212. In some embodiments, identifying the flow context information may be accomplished when a virtual machine, or an application running on the virtual machine, completes a socket connection. In other embodiments, identification module 106 may determine that the socket connection is subject to the data loss prevention policy.

Figure 4:
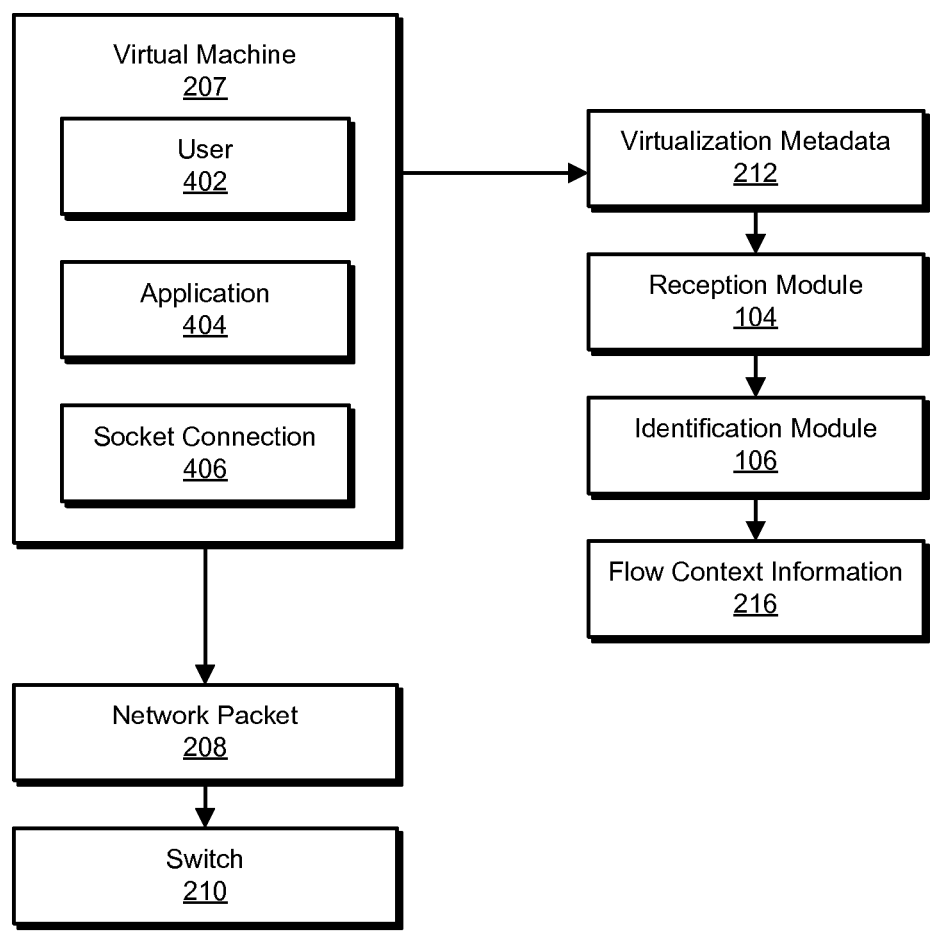
FIG. 4 is a block diagram of exemplary network packet metadata that the disclosed systems may use in preventing data loss over virtualized networks.

FIG. 4 is an illustrated example of how system 200 may receive and/or identify flow context information 216. A user 402 may be logged in to virtual machine 207 and may execute an application 404 that establishes a socket connection 406. User 402 may attempt to transmit network packet 208 via application 404 to switch 210. Reception module 104 may receive virtualization metadata 212 from virtual machine 207. Virtualization metadata 212 may contain information about user 402, application 404, and socket connection 406. Identification module 106 may utilize virtualization metadata 212 to ascertain flow context information 216.

The term "socket connection," as used herein, generally refers to an active network connection between two endpoint devices. Examples of endpoint devices may include, without limitation, virtual machines, personal computers, network servers, handheld devices, or any other suitable computing device. A socket connection may be identified in whole or in part using an Internet Protocol (IP) address and/or port number of a first computing device, and/or an IP address and/or port number of a second computing device that is engaged in a socket connection with the first computing device.

Returning to FIG. 3 at step 306, one or more of the systems described herein may provide the flow context information and the network packet to a data loss prevention service. For example, provisioning module 108 may, as part of server 206 in FIG. 2, provide (e.g., through data loss prevention callout driver 214) flow context information 216 and network packet 208 to data loss prevention service 218.

Provisioning module 108 may provide the network packet to the data loss prevention service in a variety of ways. In some examples, the callout driver may "push," or deliver, network packets to the data loss prevention service ("DLP service"). Additionally or alternatively, the DLP service may request network packets from a packet queue maintained by the callout driver. Provisioning module 108 may additionally or alternatively provide flow context information to the DLP service in a variety of ways. In some examples, provisioning module 108 may provide the flow context information to the DLP service in association with a single network packet. As an example illustrated in FIG. 2, data loss prevention callout driver 214 may send network packet 208 and flow context information 216 to data loss prevention service 218.

In some embodiments, provisioning module 108 may provide the flow context information and the network packet to the DLP service by receiving a set of network packets transmitted to the switch and storing the network packets in a flow queue that is associated with the flow context information. Provisioning module 108 (or another module) may determine (e.g., upon establishing a socket connection) whether, based on a filtering configuration, the socket connection should be monitored for DLP. The DLP service may transmit the filtering configuration to the data loss prevention callout driver in response to the powering on of the virtual machine. If provisioning module 108 determines that the socket connection should be monitored, then provisioning module 108 may allocate a flow context in response, which may include a packet queue (as discussed below), and associate it with the socket connection.

Figure 5:
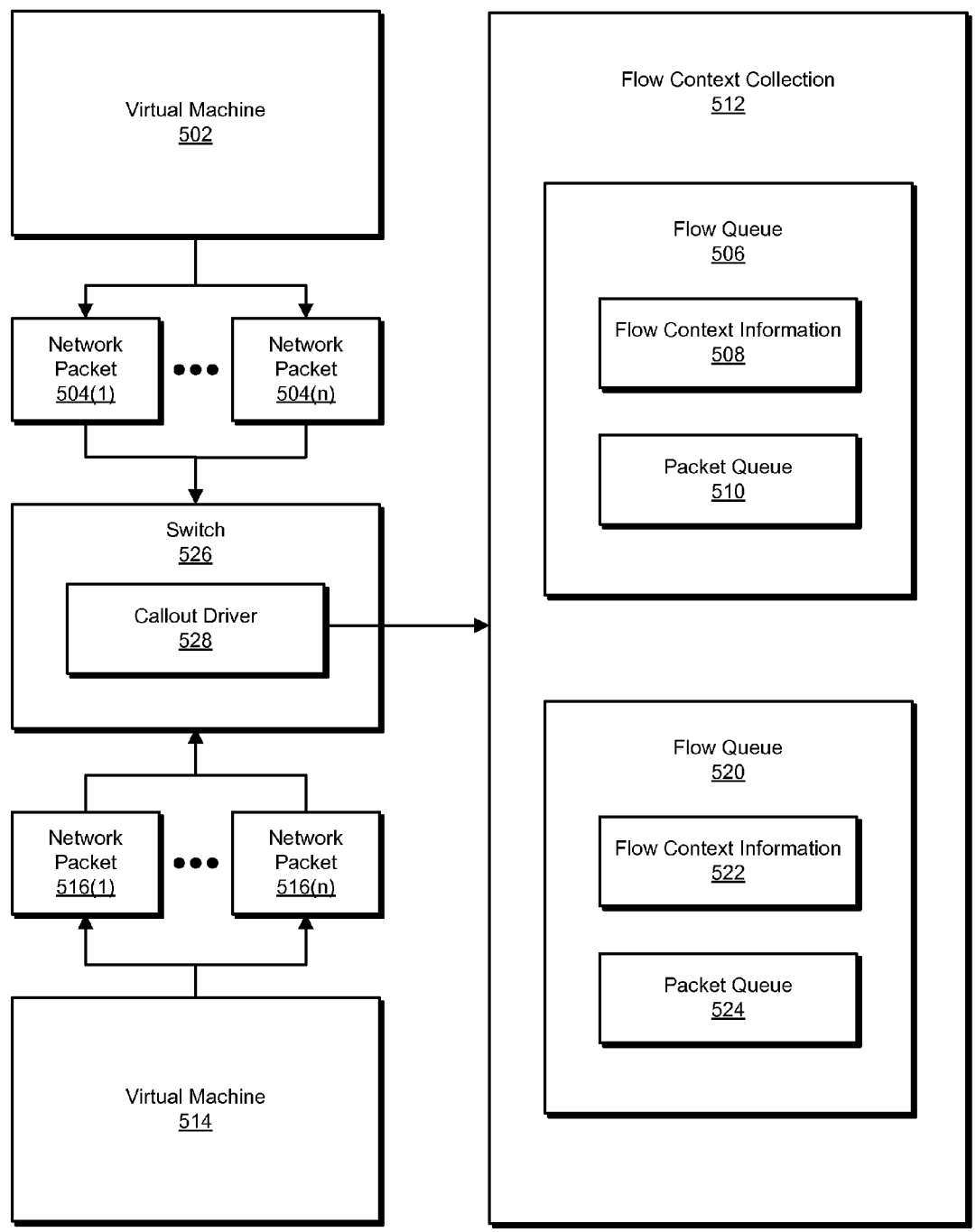
FIG. 5 is a block diagram of exemplary packet queues that the disclosed systems may use in preventing data loss over virtualized networks.

With reference to FIG. 5, a virtual machine 502 may transmit a series of network packets 504(1)-(n) to a switch 526, to which a callout driver 528 may be registered. Callout driver 528 may be registered for every virtual network switch on the hypervisor. Similarly, a virtual machine 514 may also transmit a series of network packets 516(1)-(n) to switch 526. Callout driver 528 may maintain a flow context collection 512 that may contain one or more flow queues. In this example, callout driver 528 may determine that network packets 504(1)-(n) may be associated with flow context information 508. Callout driver 528 may accordingly store network packets 504(1)-(n) in a packet queue 510 as part of a flow queue 506. Callout driver 528 may determine, through a similar process, that network packets 516(1)-(n) should be stored in a packet queue 524 in association with flow context information 522 as part of a flow queue 520. If a virtual machine begins transmitting a new series of network packets associated with new flow context information, callout driver 528 may accordingly create a new flow queue for the new series of network packets in association with the new flow context information.

In some embodiments, application module 110 may receive multiple network packets associated with the same flow context information. Application module 110 may then assemble the network packets into a network stream and examine the network stream as a whole for DLP policy violations. For example, application module 110 may assemble network packets 504(1)-(n), received as part of packet queue 510, into a network stream and analyze the network stream, along with flow context information 508, for data loss prevention policy compliance. Application module 110 may also send the network stream and flow context information 508 to another module (or sub-module within application module 110) to perform this analysis.

The term "network stream," as used herein, generally refers to any series of network packets that may compose a digital communication between computing devices over a network. A network stream may be executed under a network protocol. Examples of network protocols include, without limitation, HYPERTEXT TRANSFER PROTOCOL (HTTP), TRANSMISSION CONTROL PROTOCOL (TCP), FILE TRANSFER PROTOCOL (FTP), POST OFFICE PROTOCOL (POP), INTERNET MESSAGES ACCESS PROTOCOL (IMAP), or any other suitable network protocol.

Returning to FIG. 3 at step 308, one or more of the systems described herein may apply, through the DLP service, a data loss prevention policy to the network packet based on the flow context information. For example, application module 110 may, as part of server 206 in FIG. 2, apply, through the DLP service, a DLP policy to network packet 208 based on flow context information 216.

Application module 110 may apply the DLP policy in a variety of ways. For example, application module 110 may determine that the transmission of a network packet constitutes a violation of a DLP policy. In other examples, application module 110 may determine that transmission of a group of packets would violate a DLP policy. In some examples, application module 110 may apply the DLP policy by filtering the network packet to prevent the network packet from being forwarded by the switch to the network packet's intended destination. Alternatively, application module 110 may determine that transmitting the network packet does not represent a violation of the DLP policy. In such cases, applying the DLP policy may constitute forwarding the network packet to an original destination via the switch. In one example, as illustrated in FIG. 2, application module 110 may determine that transmission of network packet 208 as associated with flow context information 216 constitutes a violation of DLP policy 220. In this example, data loss prevention service 218 may instruct filtering engine 222 to filter network packet 208 from switch 210, which may prevent network packet 208 from being forwarded to the intended destination of network packet 208.

In some examples, the systems described herein may deliver a user interface component to a child partition upon creation of the virtual machine at the child partition. Application module 110 may use the user interface component as part of applying the DLP policy. Application module 110 may use the user interface by, for example, (1) warning a user that the user may be taking actions that violate a DLP policy and/or (2) requesting, through the user interface component, verification that the user would like to continue an action that may be in violation of a DLP policy.

In some embodiments, the DLP service may prevent data loss across multiple virtual machines, and each virtual machine may be associated with a respective child partition that may be managed by a hypervisor. In further examples, the DLP service may reside within a parent partition associated with the hypervisor that manages the virtual machine.

As described above, by monitoring network traffic through a virtual switch and obtaining context information pertaining to the traffic, the systems and methods described herein may efficiently protect virtual networks against data loss. The systems and methods may also maintain granular control over selection or application of data loss prevention policies through the use of flow context information pertaining to a virtual machine, applications that attempt to transmit network packets, and/or permissions granted to the user. Additionally or alternatively, the data loss prevention service may be screened from exposure to end users by virtue of being located in a parent partition of a virtual environment in a memory space that is not accessible to end users. Moreover, providing a centralized data loss prevention callout driver at the virtual switch may eliminate the data loss prevention footprint in each virtual machine, thereby further eliminating management of separate data loss prevention agents at each virtual machine.

Figure 6:
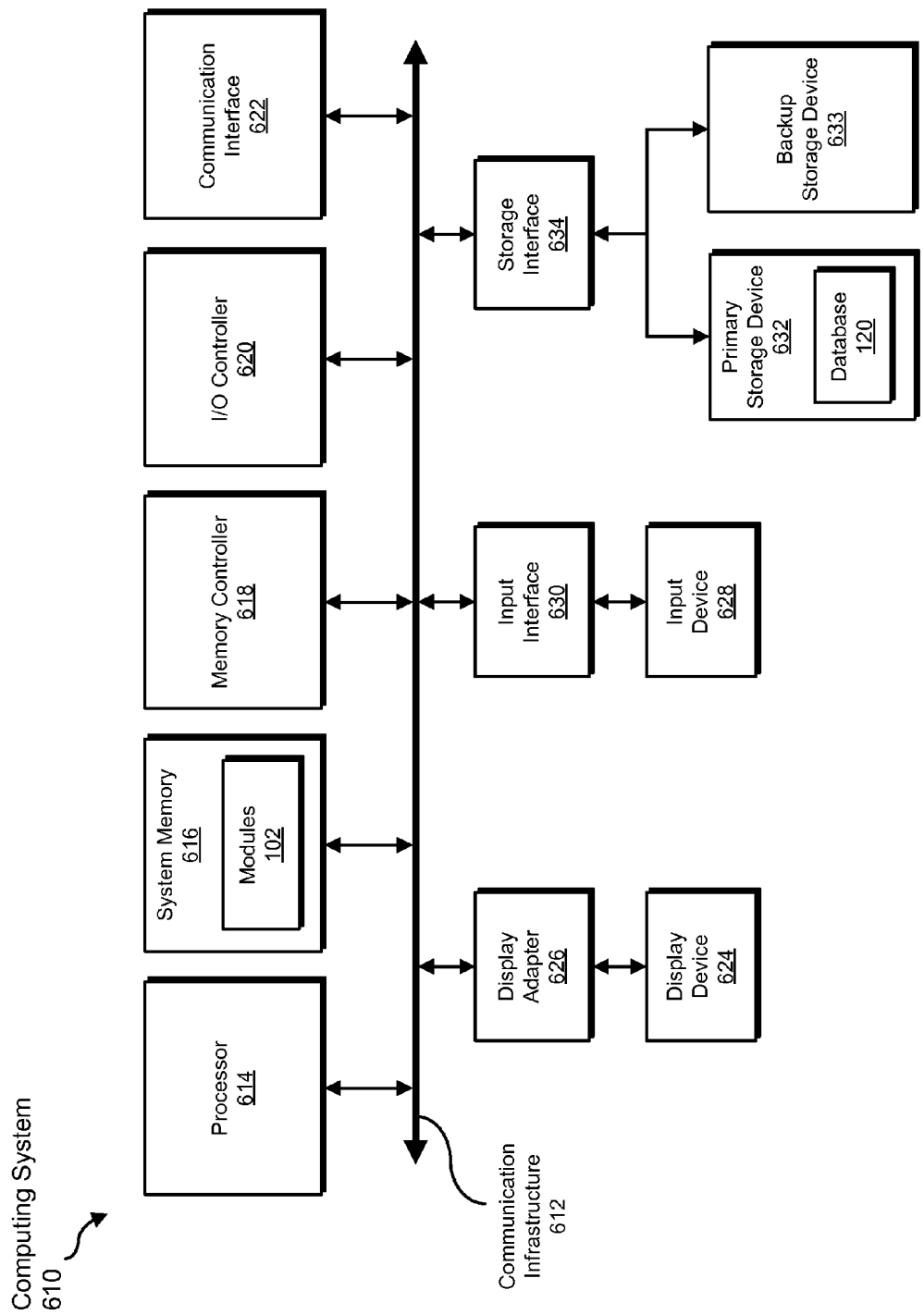
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for preventing data loss over virtualized networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive virtualization metadata, receive a network packet, transform the virtualization metadata (i.e., by generating output based on the virtualization metadata), output the transformed virtualization metadata as flow context information, analyze the network packet, transform a network switch, and/or store the result of the transformation to a memory or storage. One or more of the modules recited herein may further transform a user interface module and output the result of the transformation to an output device (e.g., a display). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing data loss over virtualized networks, at least a portion of the method being performed by a computing device comprising at least one processor, the method comprising:
   receiving, by a data loss prevention callout driver registered to a switch, a network packet from a virtual machine;
   identifying, by the data loss prevention callout driver registered to the switch, flow context information that specifies a context associated with transmitting the network packet;
   providing the flow context information and the network packet to a data loss prevention service;
   applying, by the data loss prevention service, a data loss prevention policy to the network packet based on the flow context information.

2. The method of claim 1, wherein identifying, by the data loss prevention callout driver registered to the switch, the flow context information that specifies the context associated with transmitting the network packet comprises identifying at least one of the following:
   an executable path of an application that is attempting to transmit the network packet;
   a user identification that identifies a user logged into the virtual machine that sent the network packet;
   a local internet protocol address, a local port number, a remote internet protocol address, and a remote port number that together describe a socket connection maintained by the switch.

3. The method of claim 1, wherein providing the flow context information and the network packet to the data loss prevention service further comprises receiving, by the data loss prevention callout driver, a plurality of network packets transmitted to the switch and storing the plurality of network packets in a flow queue that is associated with the flow context information.

4. The method of claim 3, wherein providing the flow context information and the network packet to the data loss prevention service further comprises assembling the network packets contained within the flow queue into a network stream.

5. The method of claim 1, wherein the data loss prevention service resides within a parent partition associated with a hypervisor that manages the virtual machine.

6. The method of claim 1, wherein the data loss prevention service prevents data loss across multiple virtual machines, each virtual machine associated with a respective child partition, the virtual machines being managed by a hypervisor.

7. The method of claim 1, wherein the switch comprises a virtualized extensible switch within a virtual network.

8. The method of claim 7, wherein the virtualized extensible switch executes within a kernel mode of a parent partition that includes a hypervisor that manages the virtual machine.

9. The method of claim 1, wherein receiving, by the data loss prevention callout driver registered to the switch, the network packet from the virtual machine further comprises the switch receiving the network packet via a virtual bus.

10. The method of claim 1, wherein applying the data loss prevention policy to the network packet further comprises:
    determining that the network packet does not violate the data loss prevention policy;
    forwarding the network packet to an original destination via the switch based on determining that the network packet does not violate the data loss prevention policy.

11. The method of claim 1, further comprising delivering a user interface component to a child partition upon creation of the virtual machine at the child partition.

12. The method of claim 11, wherein applying the data loss prevention policy further comprises at least one of:
    warning, by the user interface component, a user that the user may be taking actions that violate the data loss prevention policy;
    requesting, by the user interface component, verification that the user would like to continue an action.

13. The method of claim 1, wherein applying the data loss prevention policy further comprises filtering the network packet to prevent the network packet from being forwarded by the switch.

14. The method of claim 1, wherein receiving the network packet from the virtual machine further comprises capturing the network packet from a network connection that transmitted the network packet from the virtual machine to the switch.

15. The method of claim 1, wherein identifying the flow context information that specifies the context associated with transmitting the network packet further comprises identifying the flow context information when the virtual machine successfully completes a socket connection.

16. The method of claim 15, further comprising determining, by the data loss prevention callout driver based on the flow context information, that the socket connection is subject to the data loss prevention policy.

17. A system for preventing data loss over virtualized networks, the system comprising:
- a reception module, stored in memory, that receives, through a data loss prevention callout driver registered to a switch, a network packet from a virtual machine;
- an identification module, stored in memory, that identifies, through the data loss prevention callout driver registered to the switch, flow context information that specifies a context associated with transmitting the network packet;
- a provisioning module, stored in memory, that provides the flow context information and the network packet to a data loss prevention service;
- an application module, stored in memory, that applies, through the data loss prevention service, a data loss prevention policy to the network packet based on the flow context information;
- at least one physical processor configured to execute the reception module, the identification module, the provisioning module, and the application module.

18. The system of claim 17, wherein the identification module identifies, through the data loss prevention callout driver registered to the switch, the flow context information that specifies the context associated with transmitting the network packet by identifying at least one of the following:
- an executable path of an application that is attempting to transmit the network packet;
- a user identification that identifies a user logged into the virtual machine that sent the network packet;
- a local internet protocol address, a local port number, a remote internet protocol address, and a remote port number that together describe a socket connection maintained by the switch.

19. The system of claim 17, wherein the provisioning module provides, through the data loss prevention callout driver, the flow context information and the network packet to the data loss prevention service.

20. A non-transitory computer-readable medium comprising one or more computer-readable instructions that, when executed by at least one processor of a computing device, cause the computing device to:
- receive, by a data loss prevention callout driver registered to a switch, a network packet from a virtual machine;
- identify, by the data loss prevention callout driver registered to the switch, flow context information that specifies a context associated with transmitting the network packet;
- provide the flow context information and the network packet to a data loss prevention service;
- apply, by the data loss prevention service, a data loss prevention policy to the network packet based on the flow context information.

\* \* \* \* \*